July 16, 1963  E. M. GODFREY, JR  3,097,984
TIRE RETREAD MATERIAL ROLLING MACHINE
Filed Sept. 14, 1955  4 Sheets-Sheet 1

INVENTOR
ELMORE M. GODFREY, JR.

BY

ATTORNEYS

July 16, 1963 E. M. GODFREY, JR 3,097,984
TIRE RETREAD MATERIAL ROLLING MACHINE
Filed Sept. 14, 1955 4 Sheets-Sheet 2
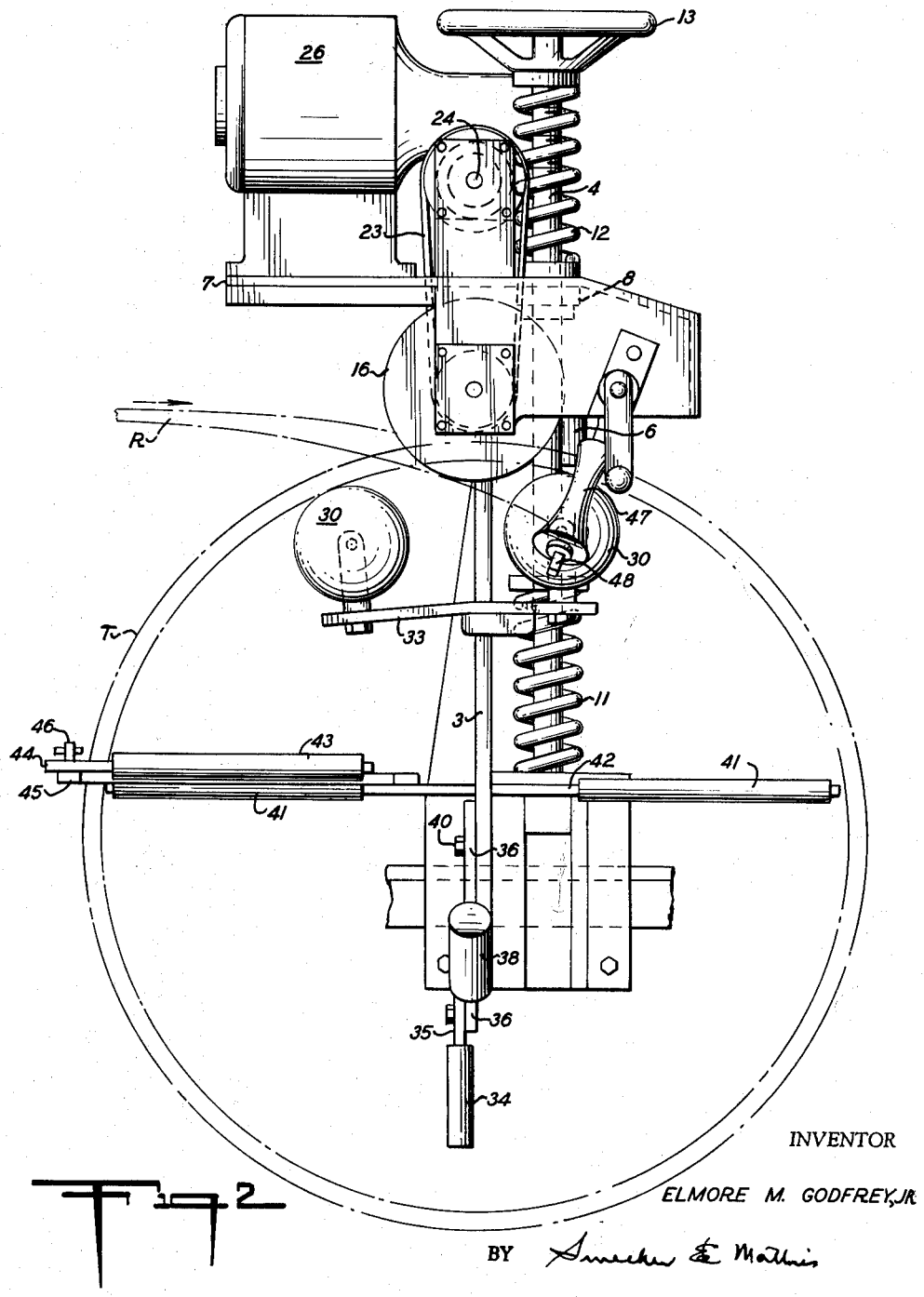
INVENTOR
ELMORE M. GODFREY, JR.
BY
ATTORNEYS

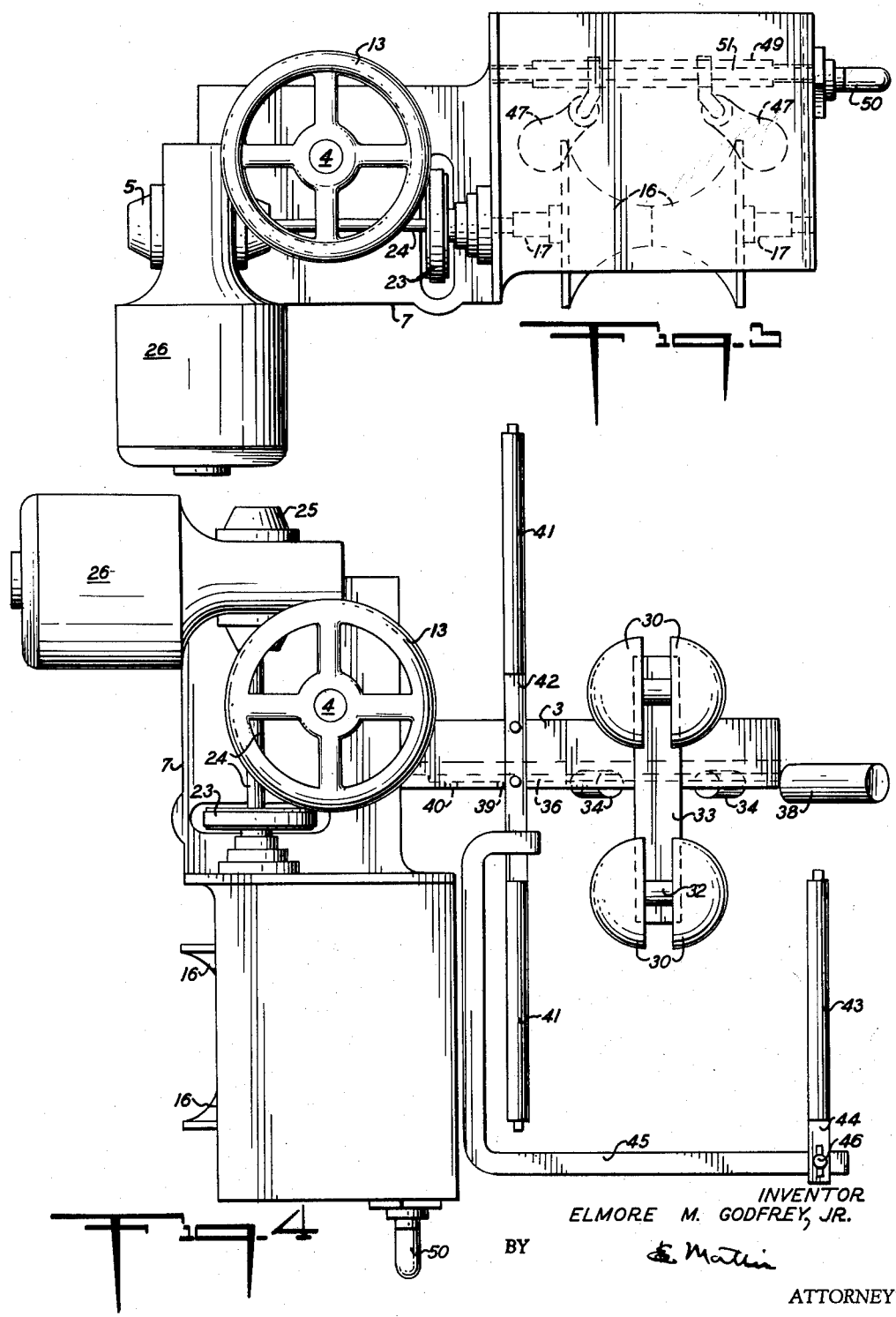

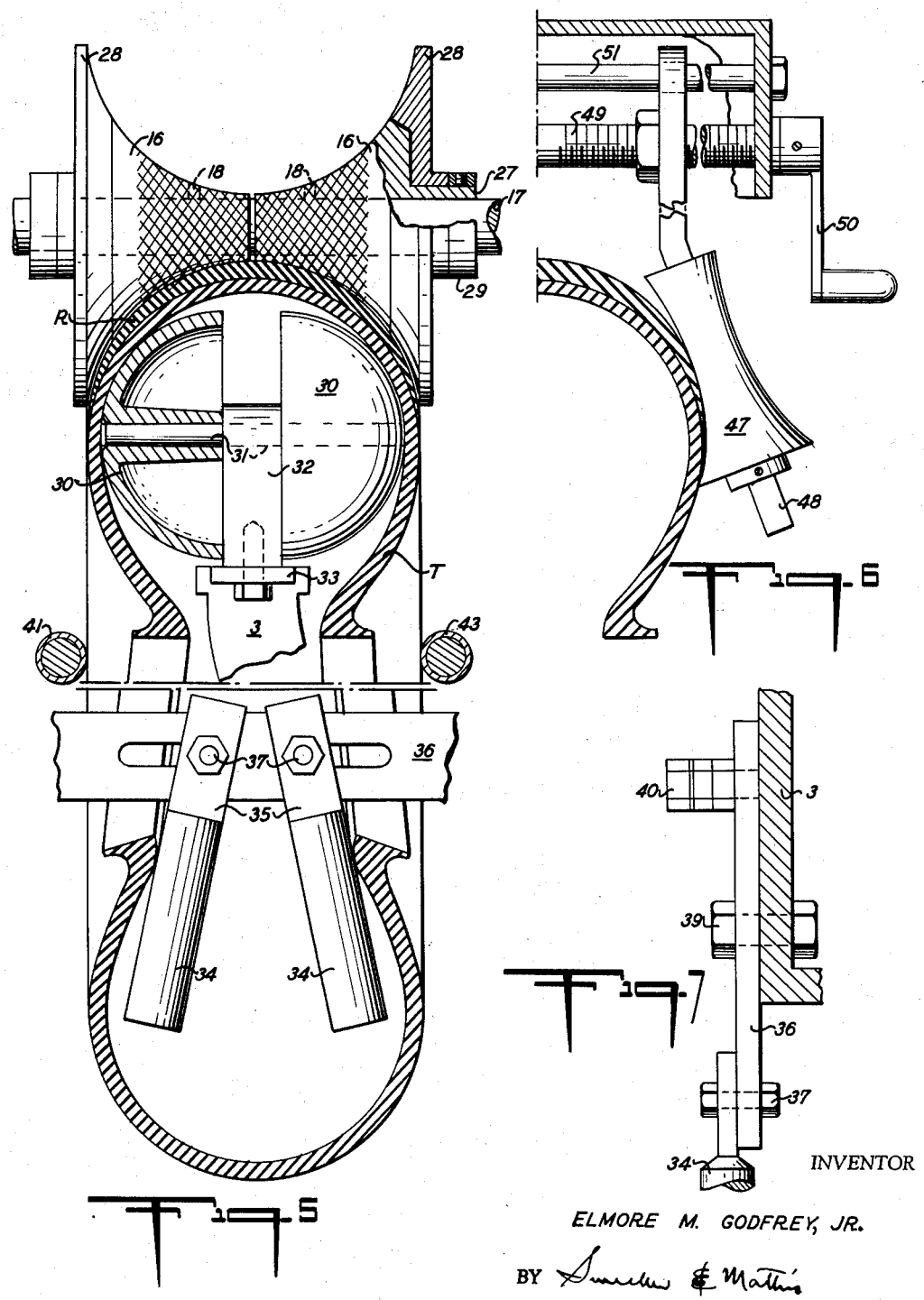

United States Patent Office 3,097,984
Patented July 16, 1963

3,097,984
TIRE RETREAD MATERIAL ROLLING MACHINE
Elmore M. Godfrey, Jr., % Godfrey Tire Co., Knoxville, Tenn.
Filed Sept. 14, 1955, Ser. No. 534,292
8 Claims. (Cl. 156—408)

This invention relates to improvements in tire retread material rolling machine.

In applying retread material to an automobile or truck tire, it is the customary practice to remove the whole peripheral surface of the tire by a cutting or abrading action to a sufficient depth, after which a cement coating is applied on the surface of the tire. Then a strip of rubber material is applied over the cemented surface for adhesive connection thereby to the tire capable of being vulcanized thereon so as to form a new tread.

It is important that this retread material be secured tightly to the tire by the cement applied. It has been customary to roll the retread material over the cemented surface, in an effort to improve the adhesion of the retread material to the tire, to exclude the air therebetween and to cause the cement to adhere tightly to the retread material and to the tire. Tire rollers that have been in use heretofore for the purpose have been very expensive and complex and have been subject to objections in practice.

One object of this invention is to improve the construction of tire rollers, to provide a less expensive and simpler construction which, nevertheless, is more effective for rolling the retread material in place on the tire.

Another object of the invention is to provide in a tire retread roller a construction capable of accommodating either passenger car tires or truck tires, without requiring separate machines for the respective sizes of tires.

Still another object of the invention is to provide in a tire retread material roller for the mounting of the tire in place and holding it securely during the rolling of the tread material thereon, and for adjustment of the retread material roller to accommodate tires of different sizes.

These objects may be accomplished according to one embodiment of the invention by providing a mounting having supporting rollers thereon to fit within the tire and to hold the latter for turning movement during the rolling of the tread material thereon. An external roller is mounted in position to coact with the external surface of the tire to receive, between said external roller and the periphery of the tire, the retread material that is to be adhesively secured to the tire and to be rolled in place by this device. The external roller should be power driven for frictional connection with the periphery of the tire and with the retread material with sufficient pressure to cause a bodily turning movement of the tire on the inside rolls as the external roller is power driven. Provision is made for adequately guiding the tire to maintain its rotation, as well as for rolling down the edges of the retread material substantially in the form of feather edges, to prevent separation at opposite sides thereof. Adjustment may be made of the rolling means and mounting means to accommodate tires of different sizes, either of passenger car size or of truck tires, all of which may be accommodated on a single machine, without requiring separate machines for the respectively different sizes of tires.

This embodiment of the invention is illustrated in the accompanying drawings, in which:

FIG. 2 is a similar view at right angles thereto, but in which the body structure is lowered into rolling relation with the tire;

FIG. 3 is a top plan view of the machine, with the head structure in the rolling position;

FIG. 4 is a similar view, showing the head structure turned at right angles thereto, adapted to receive the tire in place;

FIG. 5 is a vertical cross section through the supporting and rolling means for the tire;

FIG. 6 is a similar view showing the edge rolling attachment; and

FIG. 7 is a detail cross section, showing the mounting of the guiding lever on the supporting arm.

Figure 1:
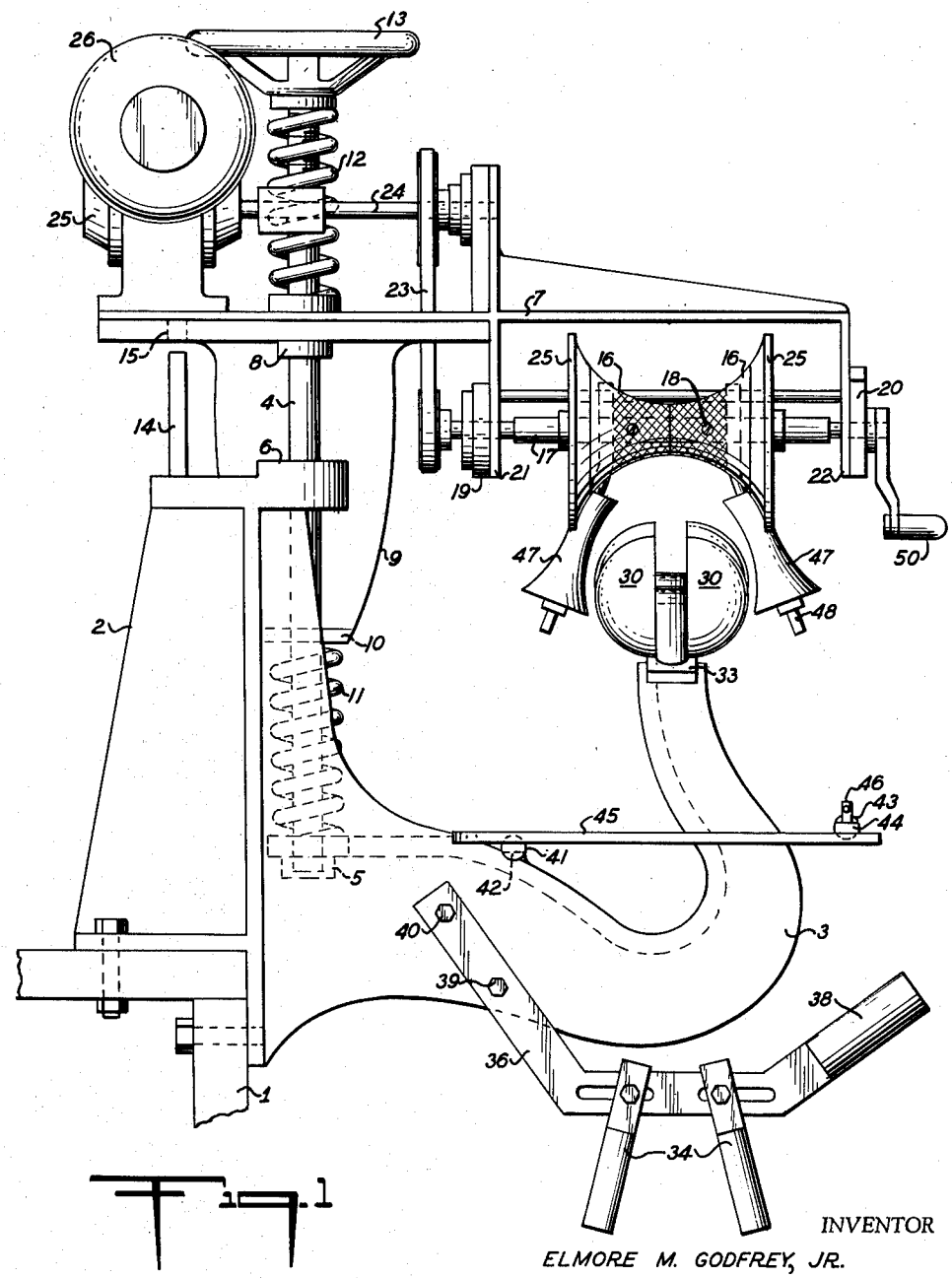
FIG. 1 is a side elevation of the rolling machine, with the head structure elevated, adapted to receive a tire in the machine.

The embodiment of the invention illustrated in the drawings is shown as including an upright support, generally designated by the numeral 1, which may be in the form of a stand, column or other suitable device for holding the operating parts of the machine. This stand 1 may be portable, if desired, or mounted securely in a fixed position on the floor or on a bench.

Mounted on the support 1 is a base, generally designated by the numeral 2. The base 2 is shown in the form of a casting and as extending upwardly from the stand 1, being elongated somewhat for supporting the operating parts of the machine. However, the shape and structure of this base 2 may be varied as desired. Mounted on the base 2 and extending laterally therefrom is a supporting arm 3 which is shown as substantially in the form of a gooseneck to facilitate the mounting of a tire. Here again, the shape of this arm may be varied as desired.

An upright spindle is shown at 4 extending beside the base 2 and carried by the latter. The spindle 4 is mounted at its lower end in a step bearing 5 on a side of the arm 3 and extends through a bearing 6 at the upper end of the base 2, which bearings 5 and 6 support the spindle 4 in secure relation in upwardly extending position beside the base.

A head is designated generally at 7, being of sufficient size to support the operating parts of the machine. This head 7 is journaled on the spindle 4, having a bearing 8 in the head slidably and rotatably mounted on the spindle 4 capable of raising and lowering movement relative thereto, as well as swinging movement between the two respective positions illustrated in FIGS. 3 and 4.

The head 7 has a depending arm 9 with an offset portion 10 sleeved over the spindle 4 intermediate the bearings 5 and 6. A coiled spring 11 is sleeved over the spindle and is interposed between a flange on a side of the arm 3 and the offset portion 10 of the arm 9, to provide a resilient support for the arm and the head 7, permitting said head to move up and down with respect to the arm 3, as well as to swing about the spindle 4 between the positions shown in FIGS. 3 and 4. The head 7 is urged downward on the spindle 4 by a coiled spring 12 sleeved over the upper end portion of the spindle 4 and interposed between a hand wheel 13 and the upper side of the head. The hand wheel 13 is adjustably mounted on the screw threaded upper end of the spindle 4 to vary the tension of the spring 12 and thereby urge the head 7 downward along the spindle or permitting it to be raised. When the tension on the spring 12 is released, by unscrewing the hand wheel 13, the head will be lifted to the position shown in FIG. 1 by the tension of the spring 11. When the hand wheel 13 is screwed down on the threaded upper end of the spindle 4, the tension of the spring 12 can be increased to an extent sufficient to force the head downward to its lowered position, as illustrated in FIG. 2.

The swinging movement of the head 7 around the spindle may be controlled in any desired manner. I have provided a pilot pin 14 on the base 2 and extending upwardly therefrom in position to enter a hole 15 in the head 7 when the head is moved downward along the spindle to its lowered position, for locking the head against rotation around the spindle. This is desirable particularly in the operating position of the head, as shown in FIG. 2, to prevent displacement of the rollers relative to the tire. Thus, when the head is turned to the position shown in FIG. 3 and the hand wheel 13 is screwed down on the upper end of the spindle 4, the head 7 will be held in this position during the action on the tire.

The head 7 carries a pair of rollers 16 on the under side thereof for rolling the retread material on the periphery of the tire. The rollers 16 are mounted on a shaft 17 to which they may be secured rigidly in any suitable manner, as by means of set screws 18. The shaft 17 is journaled at its opposite ends in bearings 19 and 20 carried by depending brackets 21 and 22, respectively, on the head 7.

The shaft 17 projects through the bearing 19 and has a driving connection 23 with a drive shaft 24, as by means of a belt and pulleys, although other suitable driving means may be used for the purpose if desired. The drive shaft 24 is operated by a speed reducer 25 driven by a motor 26 mounted on the head 7.

Referring to FIG. 5, I have shown each of the rollers 16 as fixed on the shaft 17 to rotate therewith. Each of the rollers 16 has a projecting hub 27 upon which is journaled a flange section 28 forming a continuation of the roller 16 and held in place by a locking ring 29 secured rigidly upon the hub 27. The flange 28 forms a ring which is free to revolve relative to the connected roller 16 and will extend the peripheral contact of the roller with the tire or the retread material thereon, as shown in FIG. 5.

The tire is generally indicated in FIG. 5 by the letter T, while the retread material is shown at R. This retread material usually is fed onto the periphery of the tire, as indicated in FIG. 2, where it is rolled in place by the roller 16.

The tire is mounted on the arm 3 by pairs of guide rolls shown at 30. The rolls 30 are journaled on pins 31 carried by brackets 32 at opposite ends of a cross member 33 secured to the free end of the arm 3. The rolls 30 are in proper positions for bearing upon the inner surface of the tire T when the latter is in position to receive the retread material R. It will be noted from FIG. 2 that the rolls 30 are spaced apart so that the rollers 16 act between them rather than directly in radial opposition. This relation presents a smoother operation and facilitates the pressing of the retread material onto the periphery of the tire.

Provision is made preferably for guiding the lower circumference of the tire. Guide rolls 34 are provided for this purpose, engaging on the inner side of the tire in diametrically opposed relation from the guide rolls 30, as will be apparent from FIGS. 2 and 5. The guide rolls 34 are journaled on fingers 35 carried by a support lever 36. The support arm or lever 36 is provided with slots therein to receive bolts 37 connected with the fingers 35 for adjustably securing the fingers in different laterally spaced positions along the support lever 36, as, for instance, to accommodate tires of different sizes.

The support lever 36 is provided with a handle 38 on one end thereof and is pivotally supported at 39 at its opposite end on a side of the arm 3. A pin 40 screw threaded in the projecting end of the support lever 36, is adapted to engage frictionally with a side of the arm 3 to hold the support lever in an adjusted position.

The tire is further held in place by side guide or locating rollers 41 mounted on a cross frame 42 at the back side of the tire, which cross frame extends transversely over the arm 3 and is carried thereby. The rollers 41 will engage the tire at horizontally spaced parts thereof on one side. A companion and opposition roller is shown at 43 at the front side of the tire, carried by an arm 44, which is supported by a frame 45 mounted on the frame 42 and extending at an angle thereto, as shown in FIG. 4, to encircle the periphery of the tire. A locking device is shown at 46 for securing the arm 44 to the frame 45, and which locking device may be loosened to permit lateral swinging of the roller 43, when the tire is to be removed from the machine.

Provision may be made also, if desired, for rolling the feather edge on the retread material R. I have shown a pair of rollers at 47 in FIGS. 1 and 6. Each of the rollers 47 is journaled on an arm 48 extending laterally and downwardly from a shaft 49. The shaft 49 extends lengthwise of the head 7 and preferably is externally threaded at the point of mounting the arm 48 thereon so that, upon rotation of the shaft 49, the arm will be moved axially thereof. The threaded portions of the shaft 49 at opposite sides should be threaded in opposite directions, so as to move the rollers 47 from and toward each other upon rotation of the shaft. A handle 50 is connected with the shaft 49 for rotating the latter. The rollers may be guided on a guide rod 51 which extends parallel with the shaft 49 and which has sliding connection with the end portion of the arm 48.

In the use and operation of the machine for rolling retread material on a tire, the tire must first be prepared by the removal of the old tread surface, in a manner well understood in the art. Usually, this involves the cutting or abrading of the tread surface to a desired extent, down to the fabric layer of the tire casing. When that has been done, cement is applied to the periphery of the casing throughout the portion thereof that is adapted to receive the retread material. Such cement may be applied in any suitable or desired manner. The tire is then ready for application of the retread material thereto.

Before mounting the tire in this machine, the head 7 is moved about the axis of the upright column 4 to the position shown in FIG. 4, at right angles to the operating position of the head. The guide roller 43 may be moved laterally upon release of the pivot clamp 46. Then, the tire can be threaded over the arm 3 and seated upon the guide rolls 30 which fit against the inner surface of the tire at the top. During this insertion of the tire over the guide rolls 30, the lever support 36 is raised about the pivot 39 to permit the lower portion of the tire to clear the guide rolls 34. Thereafter the support lever 36 is lowered until the guide rolls 34 enter the tire at the bottom in guiding relation with opposite sides thereof, as shown in FIG. 5, thus cooperating with the guide rolls 30 to guide the rotating movement of the tire at diametrically opposite sides. The support lever 36 may be locked in its set position by the locking pin 40 which will hold the guide rolls 34 in the relation mentioned.

The head 7 will be moved to a lateral position over the tire at the periphery thereof, as shown in FIG. 3. The guide roll 43 will also be moved into guiding relation with the outside of the tire at the front, coacting with the guiding rolls 41 for guiding the tire therebetween.

After movement of the head 7 to the position shown in FIG. 3 and also in FIG. 1, the head is lowered until the rollers 16 bear upon the periphery of the tire. This is accomplished by rotating the hand wheel 13 on the screw threaded upper end of the standard 4 until the guide pin 14 enters the hole 15 and the rollers 16 are moved into sufficient resilient contact with the periphery of the tire. If the rollers 47 are also used, they may be brought into positions, laterally embracing the tire, substantially as indicated in FIGS. 1 and 6. The rollers 47 rotate freely on the arms 48, but are moved laterally from and toward each other upon rotation of the threaded shaft 49 by the handle 50.

The machine is then ready for feeding of the retread material onto the periphery of the tire, which act is illustrated in dotted lines in FIG. 2. The retread material is supplied in a continuous strip and is affixed to the cemented surface of the tire and rolled tightly thereon by this machine. The rollers 16 are preferably knurled at their surfaces, so that upon rotation, these rollers apply a bodily rotation to the tire on the support rollers 30.

The rollers 16 apply the primary rolling action to the tire in cooperation with the rolls 30, firmly pressing the retread material R on the cemented surface, causing a complete exclusion of the air and a firm adhesion of the retread material to the tire. The flanges 28 (FIG. 5) rotate relative to the body portions of the rollers 16, being free of the latter, and thereby press the marginal edges of the retread material securely against the periphery of the tire. The feather edges of the retread material will be rolled firmly into place by the rolls 47 that extend even farther around the circumference of the cross section of the tire, as will be apparent from FIGS. 1 and 6, thus securely and firmly pressing the retread material onto the cemented surface of the tire throughout the section of contact therebetween.

It is possible with this machine to apply the retread material throughout the desired portion of the periphery of the tire, either for full tread or for top thread, as desired. The rolls 47 are used especially where full tread is being applied, but may not be necessary when only top tread is being used.

The machine can be used either for passenger car sizes or for much larger sizes, such as truck tires, thus making it possible to apply retread material to any such sizes of tires, all on one machine. Where truck tires are being handled, the guide rolls 34 can be extended transversely by loosening the bolts 37 and sliding the fingers 35 farther apart in the slots in the support lever 36. If desired also, the guide rolls 16 can be loosened and moved farther apart, either with or without an intervening spacer therebetween, merely upon loosening of the set screws 18, to roll the peripheral surfaces of larger tires.

In either event, a simple and effective apparatus is provided for applying and adhesively securing the retread material to the periphery of the tire, which enables this to be accomplished very quickly and easily and to facilitate the mounting and demounting of the tire on the machine. An effective result is accomplished by this machine through the secure adhesion of the retread material to the casing of the tire.

While the invention has been illustrated and described in one embodiment, it is recognized that variations and changes may be made therein without departing from the invention as set forth in the claims.

I claim:

1. A tire retread material applying machine comprising circumferentially spaced rollers for supporting a tire at the interior thereof in position for having applied a strip of retread material on the exterior periphery thereof, coaxial rollers intermediate said supporting rollers in position to apply a rolling action onto the retread material at the periphery of the tire, and means operatively connected with the rollers for driving the same.

2. A tire retread material applying machine comprising circumferentially spaced rollers for supporting a tire at the interior thereof in position for having applied a strip of retread material on the exterior periphery thereof, rollers intermediate said supporting rollers in position to apply a rolling action onto the retread material at the periphery of the tire, a shaft supporting the rollers, power means operatively connected with the shaft for driving the rollers, a head having the shaft and power means mounted thereon, and means mounting the head for bodily swinging movement about an upright axis to move the rollers into and out of positions coacting with the tire supporting means.

3. A tire retread material applying machine comprising circumferentially spaced rollers for supporting a tire at the interior thereof in position for having applied a strip of retread material on the exterior periphery thereof, rollers intermediate said supporting rollers in position to apply a rolling action onto the retread material at the periphery of the tire, power means operatively connected with the rollers for driving the same, a head having the rollers and power means mounted thereon, a base, an upright spindle supported by the base, means mounting the head on the upright spindle for up and down movement relative thereto and for swinging movement around the spindle to position the rollers in different relations to the tire on said supporting means.

4. A tire retread material applying machine comprising circumferentially spaced rollers for supporting a tire at the interior thereof in position for having applied a strip of retread material on the exterior periphery thereof, rollers intermediate said supporting rollers in position to apply a rolling action onto the retread material at the periphery of the tire, power means operatively connected with the rollers for driving the same, a head having the rollers and power means mounted thereon, a base, an upright spindle supported by the base, means mounting the head on the upright spindle for up and down movement relative thereto and for swinging movement around the spindle to position the rollers in different relations to the tire on said supporting means, means resiliently urging the head to different vertically spaced positions on the spindle.

5. A tire retread material applying machine comprising a base, an upright spindle supported on the base, a head journaled on the spindle for swinging movement relative thereto and slidably mounted on the spindle for up and down movement with respect thereto, springs sleeved over the spindle and acting on the head tending to move the head up and down with respect thereto, power means mounted on the head, and rollers mounted on the head and operatively connected with the power means to be driven thereby.

6. A tire retread material applying machine comprising a base, an upright spindle supported on the base, a head journaled on the spindle for swinging movement relative thereto and slidably mounted on the spindle for up and down movement with respect thereto, springs sleeved over the spindle and acting on the head tending to move the head up and down with respect thereto, power means mounted on the head, rollers mounted on the head and operatively connected with the power means to be driven thereby, an arm carried by the base and extending laterally therefrom, and means mounted on the arm for supporting a tire at the interior thereof in coacting relation with the rollers.

7. A tire retread material applying machine comprising a pair of rollers adapted to apply a rolling action onto retread material at the periphery of a tire, a shaft having the rollers mounted thereon, each of the rollers having an outwardly projecting hub thereon, and a flange section journaled on the hub and forming an outer continuation of each of the rollers for applying a rolling action to a lateral portion of the tire relative to the roller.

8. A tire retread material applying machine comprising interior means for supporting a tire in position for having applied a strip of retread material on the exterior periphery thereof, external means in position for applying a rolling action onto the retread material at the periphery of the tire, one of said respective means comprising a pair of rollers spaced apart circumferentially of the tire and the other of said respective means comprising a roller spaced circumferentially of the tire intermediate said pair of rollers in position to impart a rolling action to a portion of the tire extending in bridging relation between the pair of rollers and means operatively connected with at least one of the rollers for driving the same to cause circumferential turning movement of the tire between the rollers.

References Cited in the file of this patent

UNITED STATES PATENTS

| | | |
|---|---|---|
| 2,121,252 | Marco | June 21, 1938 |
| 2,498,953 | Glynn | Feb. 28, 1950 |
| 2,690,207 | Godfrey | Sept. 28, 1954 |
| 2,703,131 | Robbins et al. | Mar. 1, 1955 |
| 2,717,022 | Duerksen | Sept. 6, 1955 |
| 2,761,488 | Kreighbaum | Sept. 4, 1956 |
| 2,808,872 | Clapp | Oct. 8, 1957 |